United States Patent
Marwah et al.

(10) Patent No.: US 11,150,976 B1
(45) Date of Patent: Oct. 19, 2021

(54) ANOMALY DETECTION BASED ON HIGHER-ORDER ANOMALY SCORE

(71) Applicant: MICRO FOCUS LLC, Santa Clara, CA (US)

(72) Inventors: Manish Marwah, Santa Clara, CA (US); Martin Arlitt, Calgary (CA); Maria Pospelova, Ottawa (CA); Stephan Jou, Montreal (CA)

(73) Assignee: MICRO FOCUS LLC, Santa Clara, CA (US)

( * ) Notice: Subject to any disclaimer, the term of this patent is extended or adjusted under 35 U.S.C. 154(b) by 0 days.

(21) Appl. No.: 16/937,836

(22) Filed: Jul. 24, 2020

(51) Int. Cl.
*G06F 11/07* (2006.01)

(52) U.S. Cl.
CPC ........ *G06F 11/079* (2013.01); *G06F 11/0754* (2013.01); *G06F 11/0793* (2013.01)

(58) Field of Classification Search
CPC . G06F 11/0754; G06F 11/079; G06F 11/0793
See application file for complete search history.

(56) References Cited

U.S. PATENT DOCUMENTS

| | | | | |
|---|---|---|---|---|
| 8,327,189 | B1* | 12/2012 | Glade | G06F 11/079 714/26 |
| 8,655,623 | B2* | 2/2014 | Duyanovich | G06F 11/0709 702/182 |
| 9,122,602 | B1 | 9/2015 | Jewell et al. | |
| 9,298,525 | B2* | 3/2016 | Zhu | G06Q 10/0639 |
| 9,361,463 | B2 | 6/2016 | Ferragut et al. | |
| 9,552,263 | B2* | 1/2017 | Andre | G06F 11/079 |
| 9,904,584 | B2 | 2/2018 | Konig et al. | |
| 10,067,815 | B2 | 9/2018 | Chua et al. | |
| 10,102,056 | B1* | 10/2018 | Goldberg | G06F 11/0787 |
| 10,230,748 | B2 | 3/2019 | Brew et al. | |
| 10,339,457 | B2 | 7/2019 | Ryckbosch et al. | |
| 2018/0336353 | A1* | 11/2018 | Manadhata | G06F 16/9024 |
| 2020/0073740 | A1 | 3/2020 | Ohana et al. | |

OTHER PUBLICATIONS

Chandola et al., "Anomaly detection: A Survey", ACM computing surveys, 41.3, Sep. 2009, 1-72.
Kruskal et al., Multidimensional Scaling, Sage Univ Paper on Quantitative Application in the Social Sciences, 07-011, 1991.
Van der Maaten et al., "Visualizing data using t-SNE" Journal of machine learning research, Nov. 9, 2008, 2579-2605.
McInnes et al., UMAP: Uniform Manifold Approximation and Projection for Dimension Reduction, ArXiv e-prints 1802.03426, Dec. 7, 2018.
Scholkopf, B., Nonlinear Component Analysis as a Kernel Eigenvalue Problem, Neural Computation, 1998, 10 (5): 1299-1319.
Xu, X. et al., "Recent Progress of Anomaly Detection", Hindawi Complexity, 2019, Article ID 2386378.

\* cited by examiner

*Primary Examiner* — Joseph R Kudirka (57) ABSTRACT

First-order anomaly scores are received from related anomaly detectors. Each first-order anomaly score indicates a likelihood of an anomaly at a target system. A relatedness measure of the related anomaly detectors is determined, based on the first-order anomaly scores that have been received. A higher-order anomaly score is determined based on the relatedness measure that has been determined. The higher-order anomaly score indicates a likelihood of an anomaly at the target system. An anomaly at the target system is detected based on the higher-order anomaly score.

20 Claims, 8 Drawing Sheets

ANOMALY DETECTION BASED ON HIGHER-ORDER ANOMALY SCORE

BACKGROUND

Many different types of physical and other systems can suffer from infrequent or rare anomalies that if not detected and ameliorated in a timely manner can result in undesirable consequences. For example, computing systems may be subjected to malicious infiltration or other security incident that if not detected can result in the compromise of confidential information. As another example, the software and hardware components of a computing system may periodically fail, and if such failure is not predictively detected and the components in question replaced or updated then unavailability of the services that the system provides and/or loss of information that the system maintains may occur. Other examples of systems that may suffer from infrequent anomalies can include the seismological "system" of the Earth, which can suffer from earthquakes; financial systems, which can suffer from shocks that affect their functional integrity; and so on.

DETAILED DESCRIPTION

As noted in the background, different types of systems can suffer from anomalies. Timely and/or predictive detection of such anomalies can ensure that undesirable consequences do not occur. Anomaly detectors can be used to detect anomalies. An anomaly detector may be considered as an algorithm, technique, and so on, that receives data from and/or regarding a target system, and processes the data to output an anomaly score indicating the likelihood of an anomaly at the target system. The terminology "likelihood of an anomaly at the target system" encompasses the likelihood that an anomaly has occurred, as well as the likelihood that an anomaly will occur soon, depending on the anomaly detector and/or the target system in question.

For example, as to the detection of malicious infiltration or other security incident at a target computing system, an anomaly detector may output an anomaly score indicative of whether such malicious infiltration has occurred. The anomaly detector may receive as input the activity logs of network communication to and from the target system, utilization logs of the software components and/or hardware components of the target system, as well as other information. The anomaly detector may process such received information to generate an anomaly score indicating a likelihood that malicious infiltration has occurred. If the likelihood is greater than a threshold, for instance, then the target system may be reconfigured as a remedial action to ameliorate the detected anomaly.

As another example, as to the predictive detection of hardware and/or software component failure of a target computing system, an anomaly detector may output an anomaly score indicative of whether such a component is likely to fail soon. The anomaly detector may receive as input logs regarding the component in question, as well as other components of the target system. The anomaly detector may process the received information to generate an anomaly score indicating a likelihood that the component is on the verge of failure. If the likelihood is greater than a threshold, then the component may be replaced to avoid undesired disruption of the services that the target system provides.

For a given type of target system, there may be a large number of different anomaly detectors that can be employed. Different anomaly detectors may detect the same type of anomaly, but using different techniques or algorithms. Different anomaly detectors may detect different types of anomalies at the same target system. Using multiple anomaly detectors can ensure that if an anomaly at the target system escapes detection by one anomaly detector, another anomaly detector may still detect the anomaly. The anomaly scores output by the anomaly detectors may be aggregated or otherwise considered en masse in this respect, particularly in the case in which a large number of anomaly detectors are being employed.

For example, the anomaly scores may be aggregated to generate an overall anomaly score, which can then itself be compared to a threshold to detect an anomaly at a target system. All the anomaly scores may be aggregated or otherwise processed to generate such an overall anomaly score, or the anomaly scores from related anomaly detectors may be aggregated or otherwise processed to generate an overall anomaly score, such that there may be multiple overall anomaly scores for different groups of related anomaly detectors. As one example, the anomaly scores from anomaly detectors that detect the same type of anomaly may be aggregated or otherwise processed to generate an overall anomaly score for detecting that type of anomaly.

Techniques described herein improve anomaly detection at a target system by considering the relatedness of anomaly detectors and how such relatedness changes over time. The anomaly scores output by a pool of different anomaly detectors for a target system are considered as and referred to as first-order anomaly scores. Related anomaly detectors are selected from the pool, where the related anomaly detectors may detect the same or different type of anomalies at the target system. A measure of the relatedness of these related anomaly detectors is determined based on their first-order anomaly scores, and in turn a higher-order anomaly score is determined based on the relatedness measure. An anomaly at the target system can therefore be detected based on the higher-order anomaly score, in addition to or in lieu of the first-order anomaly scores.

The higher-order anomaly score can indicate how the relatedness measure determined from the first-order anomaly scores changes over time. For example, the higher-order anomaly score may be a second-order anomaly score indicative of the rate of change of the relatedness measure—i.e., how quickly the relatedness measure changes. As another example, the higher-order anomaly score may be a third-order anomaly score indicative of how quickly the rate of change of the relatedness measure itself changes. The higher-order anomaly score is generally an nth-order anomaly score, where n is greater than one.

The higher-order anomaly score may detect an anomaly at a target system even if the first-order anomaly scores do not. For example, the first-order anomaly scores may each be compared against the same or different thresholds, where an anomaly is detected if a minimum number of the first-order anomaly scores are each greater than its respective threshold. The higher-order anomaly score may likewise be compared against a corresponding threshold, such that an anomaly is detected if the higher-order anomaly score is greater than this threshold. There may not be a minimum number of first-order anomaly scores greater than their respective thresholds, whereas the higher-order anomaly score may be greater than its threshold. In this case, the techniques described herein provide for detection of an anomaly that would otherwise not be detected.

The higher-order anomaly score is not a mere aggregation of the first-order anomaly scores, and is not itself a measure of relatedness of the anomaly detectors that output the first-order anomaly scores. Rather, the higher-order anomaly score is based on the relatedness measure of related anomaly detectors. More specifically, the higher-order anomaly score may indicate how the relatedness measure changes over time. That is, the higher-order anomaly score may indicate how the relatedness of related anomaly detectors changes over time.

The techniques described herein are beneficial with respect to systems that generate very large amounts of data (e.g., terabytes or more) in relatively short periods of time (days, or even hours or minutes) on which basis anomaly detection is to occur. Manual inspection of such data, which may be in the form of event logs, is practically impossible, and thus effectively necessitates the usage of automated anomaly detection. The techniques described herein provide for such automated anomaly detection, based on a higher-order anomaly score, and can be efficiently performed on large amounts of data, yielding anomaly detection in near-realtime or even realtime in some cases, without having to use an extraordinary amount of computing resources.

Figure 1:
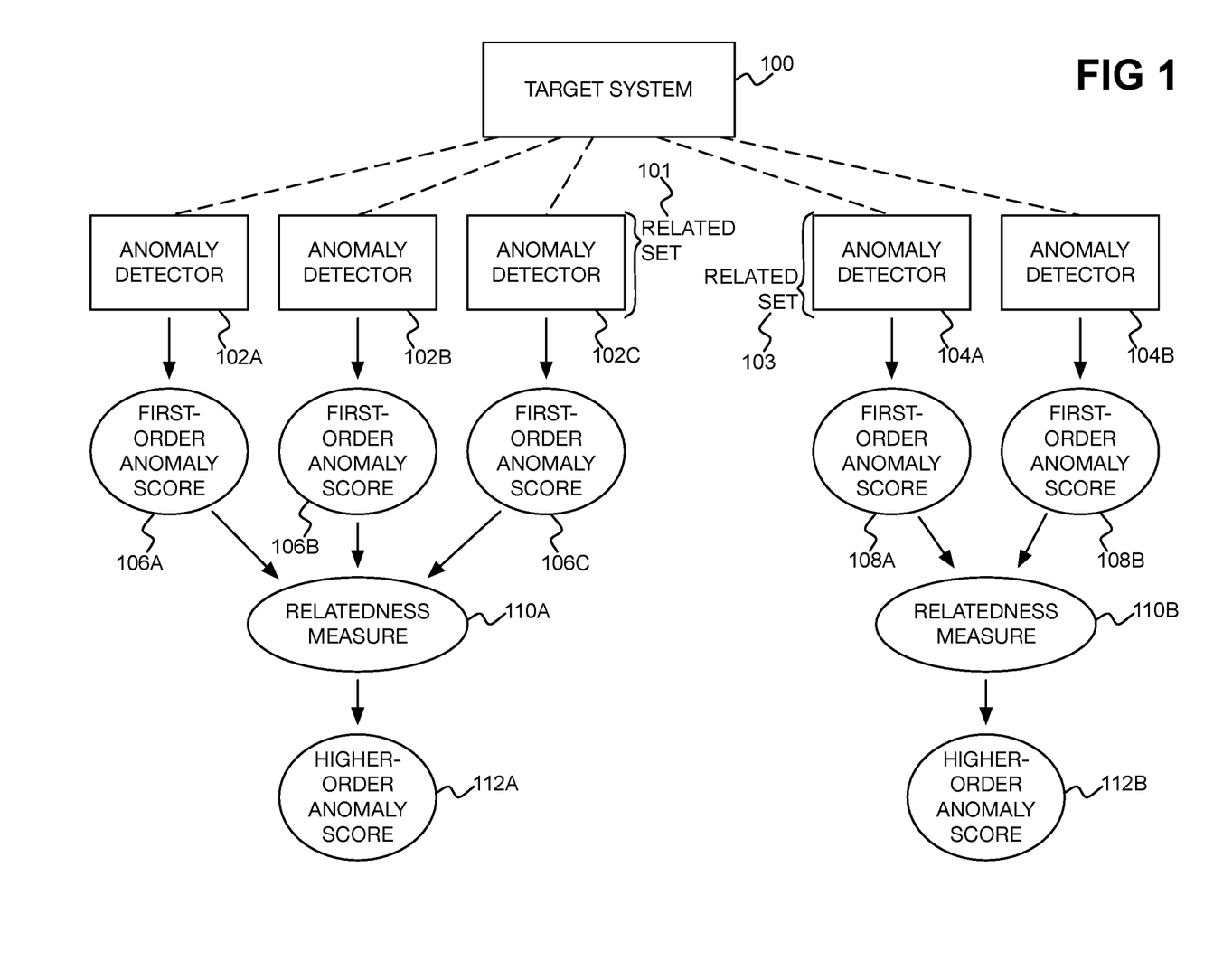
FIG. 1 is a diagram of example generation of higher-order anomaly scores for detecting an anomaly at a target system.

FIG. 1 shows an example of how a higher-order anomaly score may be generated for detecting an anomaly at a target system 100. The target system 100 may be a computing system having different hardware and software components. The hardware components may be discrete computing devices, including servers, network devices like routers and switches, and so on, and/or may be the individual components of those devices, such as processors, memory, and so on. The software components may be individual pieces of software, such as the operating system and other computer programs like application programs, and/or may be individual components of such software. The target system 100 may be a physical or other system different than a computing system, such as a seismological "system" of the Earth, a financial system, and so on.

In the case of a computing system, the anomaly may be a malicious intrusion of the computing system, an impending failure of a component of the system, or another type of anomaly. Once detected, the anomaly may be subjected to a remedial action to ameliorate the anomaly. For example, in the case of a computing system, the remedial action can include reconfiguring the system to prevent recurrence of the malicious intrusion or replacing a component of the system prior to failure to avoid undesired consequences that would otherwise result from failure.

In the case of a seismological "system" of the Earth, the anomaly may be the impending occurrence of an earthquake. The remedial action may include providing warning of the earthquake, stopping elevators and opening the doors of garages in which emergency vehicles are located, and so on. In the case of a financial system, the anomaly may be the impending occurrence of a shock that may affect the functionality integrity of the system. The remedial action may include providing early warning of the shock, engaging "circuit breakers" to prevent the occurrence of the shock, and so on.

The example of FIG. 1 shows a set 101 of related anomaly detectors 102A, 102B, and 102C, which are collectively referred to as the anomaly detectors 102, and a set 103 of related anomaly detectors 104A and 104B, which are collectively referred to as the anomaly detectors 104. While five anomaly detectors 102 and 104 organized over two related sets 101 and 103 are shown, in actuality there may be tens, hundreds, or more of event anomaly detectors organized over a similarly large number of related sets. While no anomaly detector 102 is shown as part of the related set 103 and no anomaly detector 104 is shown as part of the related set 101, in other cases an anomaly detector may be part of more than one related set, in which case a higher-order anomaly score may be detected separately for each set.

The anomaly detectors 102 and 104 each receive information regarding the target system 100, which may be in the form of historical logs of events, in the form of real-time information that may be received from sensors, and so on. The related anomaly detectors 102A, 102B, and 102C respectively generate first-order anomaly scores 106A, 106B, and 106C from the received information, which are collectively referred to as the first-order anomaly scores 106. Similarly, the related anomaly detectors 104A and 104B respectively generate first-order anomaly scores 108A and 108B from the received information, which are collectively referred to as the first-order anomaly scores 108.

A relatedness measure 110A is generated from the first-order anomaly scores 106 output by the related set 101 of anomaly detectors 102. Similarly, a relatedness measure 110B is generated from the first-order anomaly scores 108 output by the related set 103 of anomaly detectors 104. The relatedness measures 110A and 110B are collectively referred to as the relatedness measures 110. Each relatedness measure 110 numerically indicates how related the anomaly detectors of its respective set are. The relatedness measure 110A thus indicates the relatedness of the anomaly detectors 102, and the relatedness measure 110B indicates the relatedness of the anomaly detectors 104.

The anomaly detectors 102 may be considered as related in that their relatedness measure 110A is expected to remain relatively invariant over time (i.e., the relatedness measure 110A has a degree of invariance greater than a threshold). Likewise, the anomaly detectors 104 may be considered as related in that their relatedness measure 110B is expected to remain relatively invariant over time (i.e., the relatedness measured 110B has a degree of invariance greater than a threshold). Which anomaly detectors 102 and 104 are part of the related sets 101 and 103, respectively, may be determined based on an analysis of the first-order anomaly scores 106 and 108 that the anomaly detectors 102 and 104 output. An example of such classification is described in detail later in the detailed description.

Additionally, or instead, which anomaly detectors 102 and 104 are part of the related sets 101 and 103, respectively, may be specified by a user, such as a domain expert. The user may expect the first-order anomaly scores 106 output by the anomaly detectors 102 to remain invariant over time, and may likewise expect the first-order anomaly scores 108 output by the anomaly detectors 104 to remain invariant over time. In this case, the anomaly detectors 102 and 104 may be organized within their respective related sets 101 and 103 a priori, prior to the anomaly detectors 102 and 104 respectively generating their first-order anomaly scores 106 and 108.

A higher-order anomaly score 112A is determined based on the relatedness measure 110A, and similarly a higher-order anomaly score 112B is determined based on the relatedness measure 110B. The higher-order anomaly scores 112A and 112B are collectively referred to as the higher-order anomaly scores 112. For instance, the higher-order anomaly scores 112 can indicate how their relatedness measures 110 change over time, despite their regular or expected invariance. The higher-order anomaly scores 112 can thus be used to detect anomalies at the target system 100, apart from the first-order anomaly scores 106 and 108 respectively output by the anomaly detectors 102 and 104.

For example, if either or both the higher-order anomaly scores 112 each exceeds the same or different threshold (or falls outside a threshold range), then an anomaly may be considered as having been detected at the target system 100. The higher-order anomaly scores 112 may themselves be aggregated into an overall higher-order anomaly score in some fashion, or such an overall higher-order anomaly score may otherwise be determined from the higher-order anomaly scores 112. In such instance, an anomaly may be detected at the target system 100 if the overall higher-order anomaly score is greater than a threshold (or falls outside a threshold range), for example. The higher-order anomaly scores 112 can thus themselves be subjected to various aggregation or combination techniques.

Figure 2:
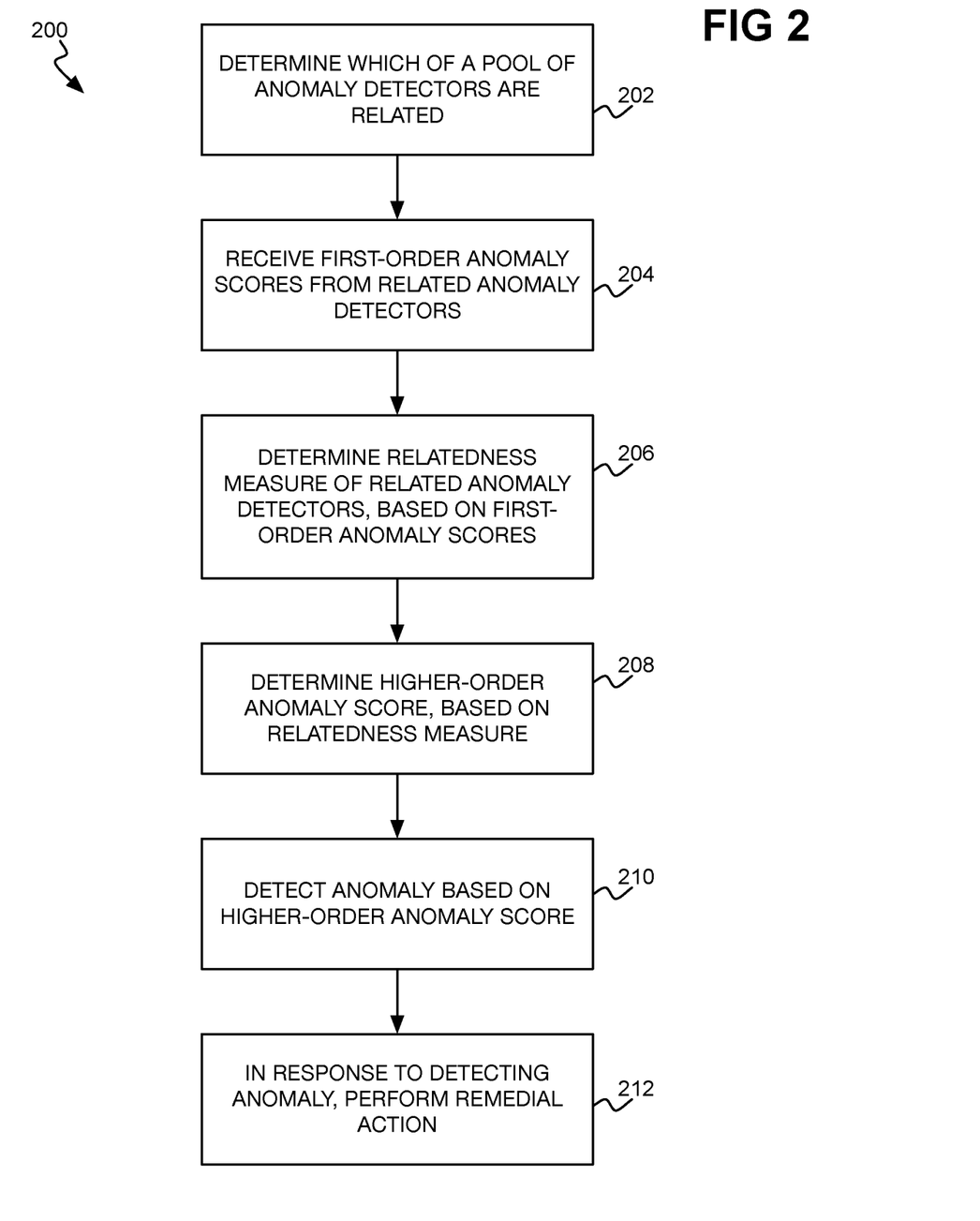
FIG. 2 is a flowchart of an example method for detecting and remediating an anomaly at a target system using a higher-order anomaly score.

FIG. 2 shows an example method 200 for detecting and remediating an anomaly at a target system using a higher-order anomaly score. The method 200 can be implemented as a non-transitory computer-readable data storage medium storing program code executed by a processor, such as a processor of a computing device. The method 200 is described in relation to one set of related anomaly detectors for a target system. However, the method 200 can be extended to multiple sets of related anomaly detectors, with a higher-order anomaly score generated for each set.

The method 200 includes determining which of a pool of anomaly detectors for the target system are related (202) in order to define the set of related anomaly detectors. Which anomaly detectors are related and therefore part of the set can be determined a priori, such as by manual specification by a domain expert or other user, before the anomaly detectors output first-order anomaly scores. Which anomaly detectors are related may be determined automatically, without user interaction. An example of such a technique is described later in the detailed description.

The method 200 includes receiving first-order anomaly scores from the related anomaly detectors (204). The first-order anomaly score output by each related anomaly detector indicates a likelihood of an anomaly at the target system. The first-order anomaly scores may be normalized to a common scale, such as from zero to one or from zero to one hundred, where a higher score indicates a greater likelihood of an anomaly at the target system. The anomaly detectors may generate their first-order anomaly scores from the same or different information from or regarding the target system. The anomaly detectors can output their first-order anomaly scores over time.

The method 200 includes determining a relatedness measure of the related anomaly detectors, based on the first-order anomaly scores (206). The relatedness measure indicates how related the anomaly detectors of the related set are to one another. The relatedness measure that is to be determined in part 206 is selected that it is invariant (i.e., the degree of invariance is greater than a threshold) when there are no anomalies at the target system. The relatedness measure may be or include pairwise relatedness measures and/or multiple-input relatedness measures.

An example of a pairwise relatedness measures includes pairwise function values like Jacquard similarity values, which measure the similarity between pairs of anomaly scores over time. Another example includes pairwise correlation coefficients, such as Pearson correlation coefficients, which measure how well pairs of anomaly scores change in-sync with each another over time. A third example includes pairwise entropy-based measures, such as the conditional entropies of pairs of anomaly scores. The conditional entropy of a pair of anomaly scores is the entropy of one anomaly score of the pair conditioned on the entropy of the other anomaly score of the pair. Other pairwise relatedness measures can be used as well.

An example of a multiple-input relatedness measure includes principal component analysis (PCA) values, where N first-order anomaly scores are linearly projected onto $M \ll N$ (i.e., M is much smaller than N) dimensions, and where M can be selected to maximize variance. Another example includes autoencoder values, where an autoencoder, which is a type of neural network, is applied to reduce dimensionality similar to PCA, but with the ability to capture non-linear relationships among the anomaly scores and not just linear relationships. Other linear and non-linear multiple-input relatedness measures can be used as well. The relatedness measure is determined over time.

If the number of anomaly detectors within the related set is equal to two, then just one or more pairwise relatedness measures are used. If just one pairwise relatedness measure is used, then this pairwise relatedness measure is the relatedness measure of the related anomaly detectors determined in part 206. If more than one pairwise relatedness measure is used, then these pairwise relatedness measures can be further combined to yield the relatedness measure of the related anomaly detectors determined in part 206.

If the number of anomaly detectors within the related set is greater than two, then one or more pairwise relatedness measures and/or one or more multiple-input relatedness measures can be used. If just one multiple-input relatedness measure is used, then this relatedness measure can be the relatedness measure of the related anomaly detectors determined in part 206. If more than one multiple-input relatedness measure is used, then these multiple-input relatedness measures can be further combined to yield the relatedness measure of the related anomaly detectors determined in part 206.

If just one or more pairwise relatedness measures are used, then each pairwise relatedness measure is computed for each unique pair of related anomaly detectors within the set and combined to yield the relatedness measure of the related anomaly detectors determined in part 206. However, if the one or more multiple-input relatedness measures are also used, then they can further be combined with the one or more combined pairwise relatedness measures to yield the relatedness measure of the related anomaly detectors determined in part 206.

The method 200 includes determining a higher-order anomaly score, based on the relatedness measure of the related anomaly detectors (208). The higher-order anomaly score may not be generated directly from any information from which the first-order anomaly scores are directly generated, such as information directly received from or directly regarding the target system. The higher-order anomaly score may further not be generated directly from the first-order anomaly scores themselves, but rather based on the relatedness measure of the related anomaly detectors that is determined directly from the first-order anomaly scores. That is, how related first-order anomaly detectors are is indicated by a relatedness measure (generated based on their first-order anomaly scores), and the higher-order anomaly score is generated based on the relatedness measure—not based on the first-order anomaly scores themselves.

The higher-order anomaly score indicates a likelihood of an anomaly at the target system, regardless of whether the first-order anomaly scores themselves indicate an anomaly, and can indicate how the relatedness measure changes over time. For example, the higher-order anomaly score may be a second-order anomaly score indicative of the rate of change of the relatedness measure—i.e., how quickly the relatedness measure changes. As another example, the higher-order anomaly score may be a third-order anomaly score indicative of how quickly the rate of change of the relatedness measure itself changes. The higher-order anomaly score may be an even higher-order anomaly score—that is, an nth-order anomaly score, where n is greater than three.

The method 200 includes detecting an anomaly at the target system based on the higher-order anomaly score (210). An anomaly may be detected if the higher-order anomaly score is greater than a threshold, for instance. An anomaly may be detected based on the higher-order anomaly score in another way as well, such as by subjecting the higher-order anomaly score to additional processing by itself or in consideration of (e.g., aggregated with) other higher-order anomaly scores, with the resulting score then itself compared to a threshold to detect an anomaly at the target system. More generally, the anomaly is detected based on the higher-order anomaly score, in a threshold-based and/or non-threshold-based manner, including classification-based approaches, nearest neighbor-based approaches, cluster-based approaches, statistical approaches, and information theoretic approaches, among others.

Depending on the target system and/or the related anomaly detectors, the likelihood of an anomaly at the target system indicated by the higher-order anomaly score encompasses the likelihood that an anomaly has occurred, as well as the likelihood that an anomaly will occur soon, as noted above. In the former case, the detection of an anomaly is thus the detection of an occurrence of the anomaly at the target system. By comparison, in the latter case, the detection of anomaly is the detection of an impending occurrence of the anomaly at the target system.

In response to detecting an anomaly at the target system, the method 200 can include performing a remedial action with respect to the target system to ameliorate the anomaly (212). Such a remedial action may be performed in addition to or in lieu of generating an alert or notification of the anomaly for subsequent user review. For example, in the case of a malicious intrusion or other security incident at a target computing system, the remedial action can include reconfiguring the system to lessen the likelihood that the same or similar type of malicious intrusion can reoccur. In the case of an impending failure of a component of a target computing system, the remedial action similarly can include reconfiguring the system (such as in the case of a software component) and/or can include replacing or fixing the component in question (such as in the case of hardware component).

For example, consider that an anomaly has been at a processor. The processor may be able to be configured to resolve the anomaly. The anomaly may specifically be due to a failed temperature sensor of the processor. If the processor has multiple temperature sensors, such as a primary temperature sensor and a backup temperature sensor, then the primary temperature sensor may be disabled and the backup temperature sensor enabled to resolve the anomaly. The processor may further or instead be replaced as a result of a notification or alert to the user of the detected anomaly.

Figure 3A:
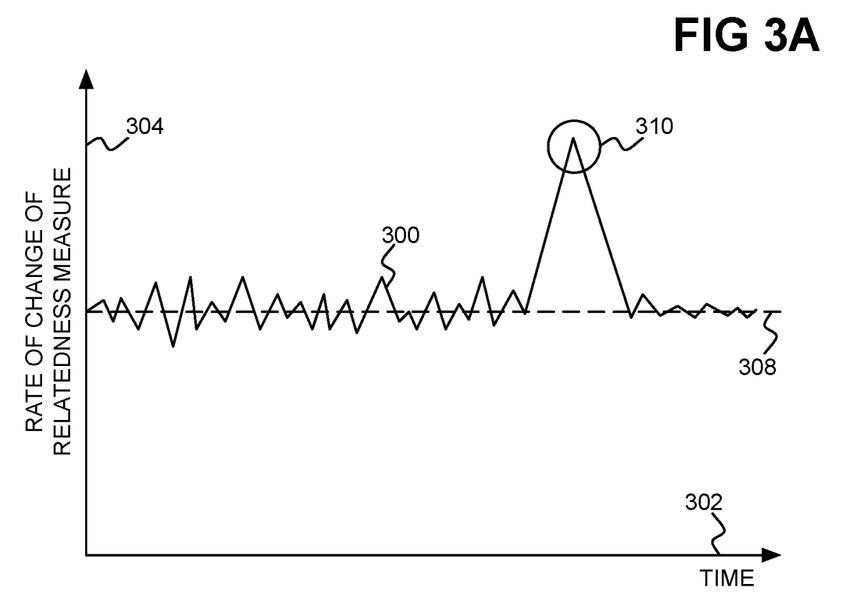
FIGS. 3A and 3B are diagrams of example representative first-order and second-order anomaly scores.
Figure 3B:
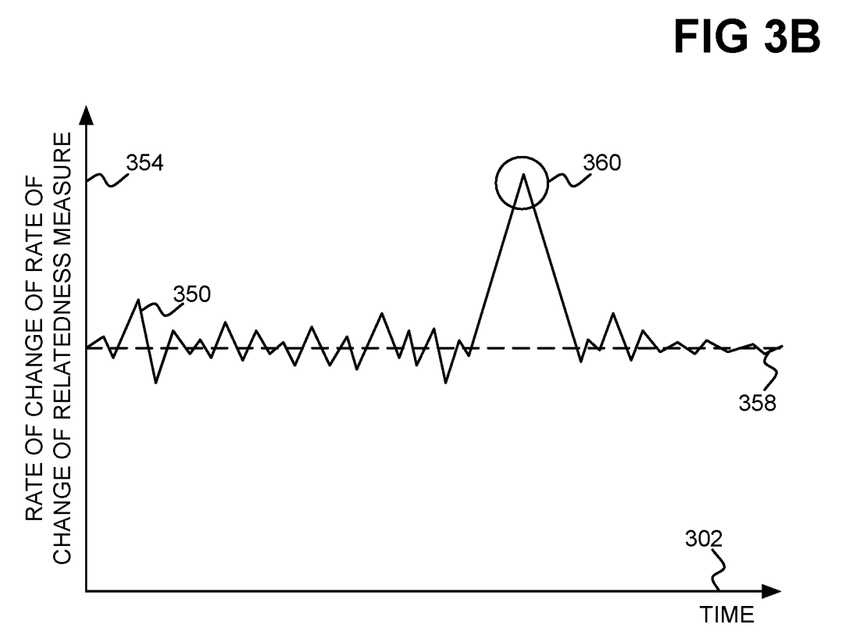

FIGS. 3A and 3B show graphs of an example second-order anomaly score 300 and an example third-order anomaly score 350, respectively, over time. In FIG. 3A, the second-order anomaly score 300 indicates the rate of change of a relatedness measure of related anomaly detectors, per the y-axis 304, over time, per the x-axis 302. The relatedness measure generally changes at relatively small rates, such that the second-order anomaly score 300 may correspondingly indicate a relatively low likelihood of an anomaly at the target system in question. However, at point 310 the rate of change of the relatedness measure is high, indicating a high likelihood of an anomaly at the target system. Such an anomaly may therefore be responsively detected.

In FIG. 3B, the third-order anomaly score 350 indicates the rate of change of the rate of change of a relatedness measure of related anomaly detectors, per the y-axis 354, over time, per the x-axis 302. (It is noted that the rate of change of the relatedness measure that the third-order anomaly score 350 indicates the rate of change of in FIG. 3B is not the rate of change of the relatedness measure that the second-order anomaly score 300 indicates in FIG. 3A.) The rate of change of the relatedness measure itself generally changes at relatively small rates, such that the third-order anomaly score 350 may correspondingly indicate a relatively low likelihood of an anomaly at the target system in question. However, at point 360 the rate of change of the rate of change of the relatedness measure is high, indicating a high likelihood of an anomaly at the target system. Such an anomaly may therefore be responsively detected.

The second-order anomaly score 300 of the example of FIG. 3A may be considered akin to the velocity of the relatedness measure of related anomaly detectors. The third-order anomaly score 350 of the example of FIG. 3B may be considered akin to the acceleration of the relatedness measure of related anomaly detectors. Either or both the second- and third-order anomaly scores 300 and 350 may be computed. An anomaly may be detected just on the basis of either anomaly score 300 or 350. For example, if either anomaly score 300 or 350 is greater than the same or different corresponding threshold, then an anomaly may be responsively detected. The second-order anomaly score 300 may be greater than its threshold without the third-order anomaly score 350 be greater than its corresponding threshold, and vice-versa.

Figure 4:
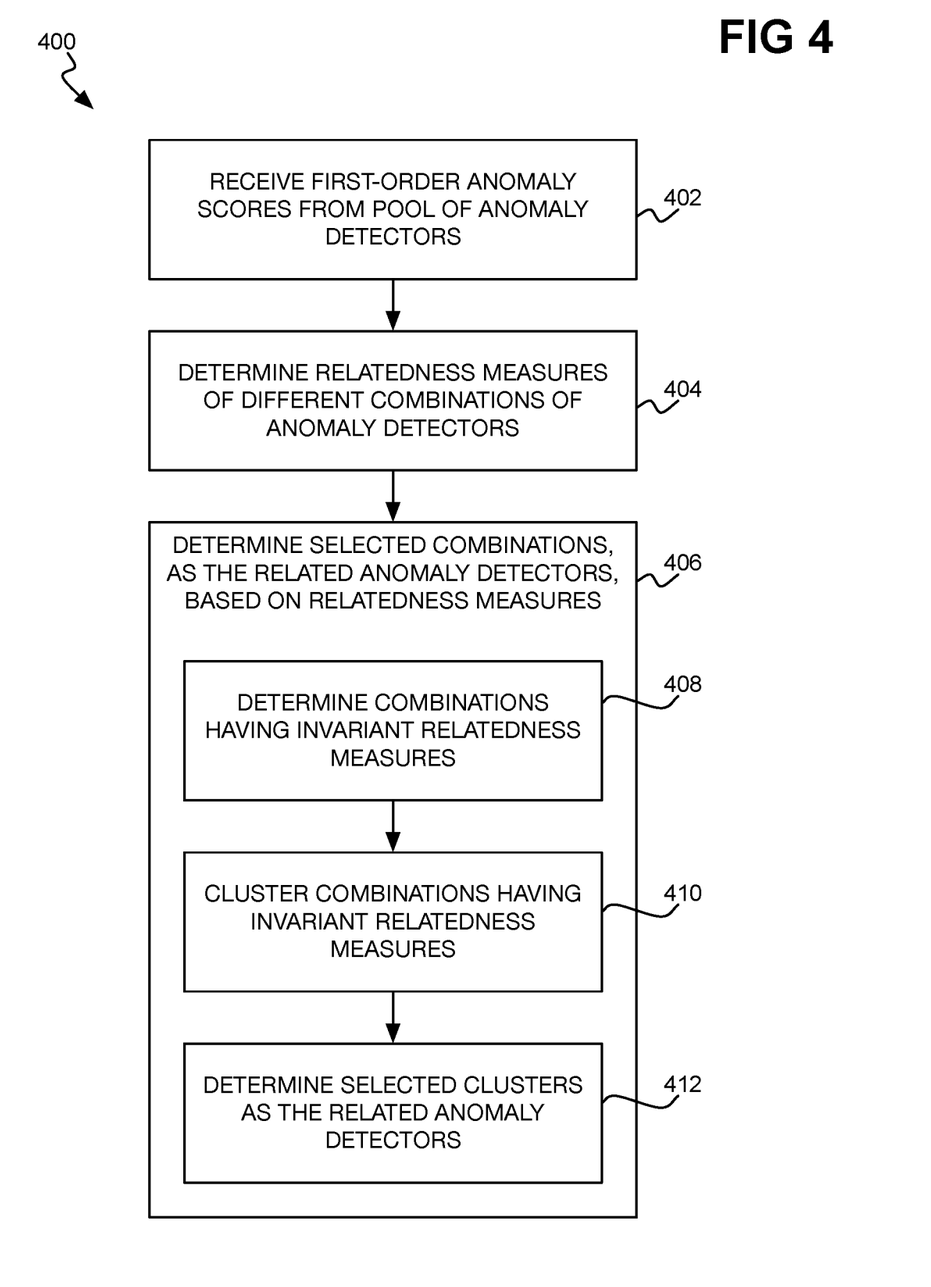
FIG. 4 is a flowchart of an example method for determining related anomaly detectors based on their first-order anomaly scores, for subsequent generation of a higher-order anomaly score.

FIG. 4 shows an example method 400 for determining related anomaly detectors from a pool of available anomaly detectors. The method 400 can be implemented as a non-transitory computer-readable data storage medium storing program code executed by a processor, such as a processor of a computing device. The method 400 can be used to implement part 202 of the method 200 of FIG. 2. The method 400 can identify one or multiple related sets of anomaly detectors.

The method 400 includes receiving first-order anomaly scores from all the anomaly detectors within the pool (402), which may be normalized to a common scale, and which each indicate a likelihood of an anomaly at a target system. The method 400 includes determining relatedness measures of different combinations of the anomaly detectors (404). The relatedness measures used in part 404 include at least the relatedness measures used in part 206 of the method 200 of FIG. 2. However, the relatedness measures used in part 404 can include additional relatedness measures, for the same or different combinations of anomaly detectors.

The combinations may include every unique combination of a specified number of anomaly detectors or a number of anomaly detectors within a specific numerical range. For example, if pairwise relatedness measures are considered, then the combinations may include every unique combination of two anomaly detectors, with every pairwise relatedness measure determined for each combination. If n>2-input relatedness measures are considered, then the combinations may include every unique combination of n>2-anomaly detectors, with each multiple-input relatedness measure determined for each unique combination of a number of anomaly detectors equal to the number of inputs. Unlike as may occur in part 206 of the method 200 of FIG. 2, the relatedness measures are not combined in part 404.

The method 400 includes determining selected combinations, as the sets of related anomaly detectors (406), based on the relatedness measures that have been determined. Determining the selected combinations to use as the sets of related anomaly detectors can be performed as follows. The combinations of anomaly detectors having invariant relatedness measures are determined (408). That is, the combinations having measures of invariance greater than a threshold can be identified.

The identified combinations can at conclusion of part 408 be selected as the sets of related anomaly detectors in one implementation. For example, if pairwise relatedness measures are determined in part 404, each unique pair of anomaly detectors having one or more invariant pairwise relatedness measures may be selected as a set of related anomaly detectors. A pair of anomaly detectors may have both invariant and variant relatedness measures. If a pair of anomaly detectors has just one invariant relatedness measure, then the relatedness measure that will be computed in part 206 of the method 200 of FIG. 2 is this invariant relatedness measure. If a pair of anomaly detectors has more than one invariant relatedness measure, then the relatedness measure that will be computed in part 206 is a combination of these invariant relatedness measures.

If multiple input relatedness measures are determined in part 404, each unique combination of n anomaly detectors having one or more invariant n-input relatedness measures may similarly be selected as a set of related anomaly detectors in part 406. The unique combinations of the same numbers of anomaly detectors are considered in this case. For example, each unique combination of three anomaly detectors having one or more invariant three-input relatedness measures may be selected as a set of related anomaly detectors, each unique combination of four anomaly detectors having one or more invariant four-input relatedness measures may be selected as a related set, and so on.

Furthermore, in one implementation, the selected combinations may be identified in part 406 by clustering. Specifically, the method 400 includes clustering the combinations of anomaly detectors into clusters of combinations having invariant relatedness measures (410), For example, a clustering technique such as k-means clustering may be employed. The method 400 includes then selecting one or more clusters as the related sets of anomaly detectors (412).

For example, the clustering technique may result in the n clusters of combinations of anomaly detectors having invariant relatedness measures, with each cluster including one or more combinations of anomaly detectors. If a cluster includes just one combination of anomaly detectors, the relatedness measure of the cluster is the invariant relatedness measure of this combination. However, if a cluster includes more than one combination of anomaly detectors, then the relatedness measure of the cluster of anomaly detectors is combination of the invariant relatedness measures of these combinations.

Every cluster may be selected as a set of related anomaly detectors. In another implementation, just a limited number of clusters may be selected as sets of related anomaly detectors, such as just the cluster having the highest relatedness measure, just the m<n clusters having the highest relatedness measures, just the clusters having relatedness measures greater than a threshold, and so on. The relatedness measure that will be determined in part 206 of the method 200 of FIG. 2 for a set of related anomaly detectors is the relatedness measure of the cluster of anomaly detectors to which the related set corresponds.

Figure 5:
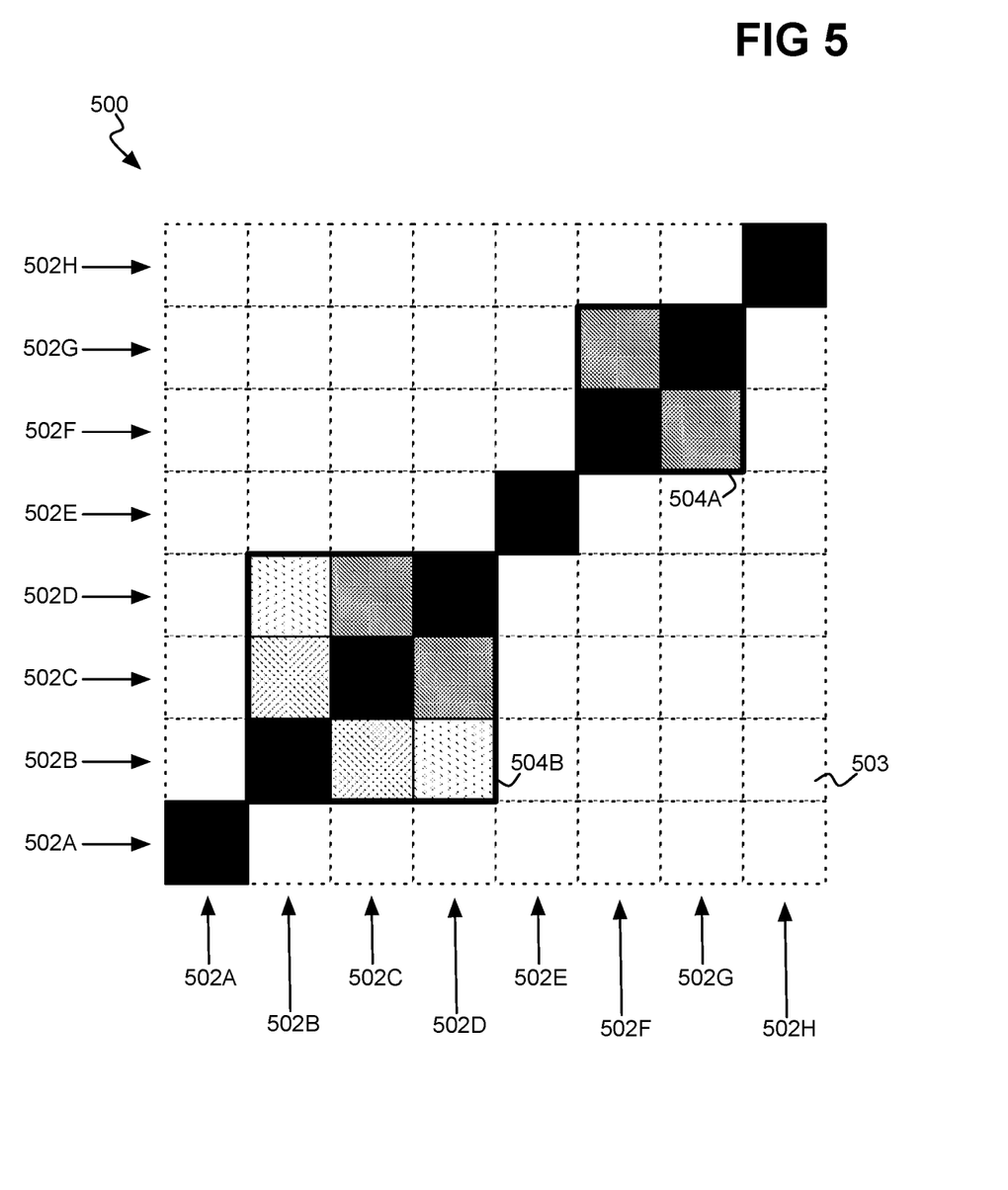
FIG. 5 is a diagram of an example representative pool of anomaly detectors that have been clustered into clusters of related anomaly detectors.

FIG. 5 shows an example representative pool of anomaly detectors that have been clustered into clusters of related anomaly detectors. FIG. 5 thus shows the result of example performance of the method 400 of FIG. 4 in the implementation in which parts 410 and 412 are performed. In the example of FIG. 5, there are eight anomaly detectors 502A, 502B, 502C, 502D, 502E, 502F, 502G, and 502H, which are collectively referred to as the anomaly detectors 502. In FIG. 5, there are rows corresponding to the anomaly detectors 502 and columns corresponding to the same anomaly detectors 502.

In the example, a pairwise relatedness measure is computed for each unique combination of two anomaly detectors 502, which is represented in FIG. 5 as the intersection of a row and a column. For example, the pairwise relatedness measure for combination of anomaly detectors 502B and 502H is the pairwise relatedness measure 503. The pairwise relatedness measure of each pair of two anomaly detectors 502 is indicated by shading in FIG. 5, with black representing maximum relatedness over time, and with white representing no relatedness over time.

As such, in the example, the pairwise relatedness measure of each anomaly detector 502 in relation to itself is perfectly invariant, and thus is represented in black. The pairwise relatedness measure for the pair of anomaly detectors 502B and 502C is more invariant than the pairwise relatedness measure for the pair of anomaly detectors 502B and 502D, and thus the invariance of the former is represented with darker shading than the invariance of the latter. Similarly, the pairwise relatedness measure of the pair of anomaly detectors 502C and 502D and the pairwise relatedness measure of the pair of anomaly detectors 502F and 502G each have greater invariance than the pairwise relatedness measure of the pair of anomaly detectors 502B and 502C.

In the example, the anomaly detectors 502F and 502G have been clustered within a cluster 504A, and the anomaly detectors 502B, 502C, and 502D have been clustered within a cluster 504B. The clusters 504A and 504B are collectively referred to as the clusters 504. Because the cluster 504A includes just two anomaly detectors 502 and the relatedness measure that is invariant is a pairwise relatedness measure of the two anomaly detectors 502 in question, the relatedness measure of the cluster 504A can be this pairwise relatedness measure.

By comparison, the cluster 504B includes three anomaly detectors 502, and encompasses three pairwise relatedness measures: the pairwise relatedness measure of the anomaly detectors 502B and 502C, the pairwise relatedness measure of the anomaly detectors 502B and 502D, and the pairwise relatedness measure of the anomaly detectors 502C and 502D. Therefore, the pairwise relatedness measure of the cluster 504B is a combination of these three pairwise relatedness measures, such as an average of the three relatedness measures.

Either or both of the clusters 504 may be selected as a related set of anomaly detectors 502. Each cluster 504 may be selected as a set of related anomaly detectors 502 if at least two related sets are desired, or if the relatedness measure of each cluster 504 is greater than a threshold. By comparison, just one cluster 504 may be selected as a set of related anomaly detectors 502 if just one related set is desired, or if just one cluster 504 is greater than the threshold.

Figure 6:
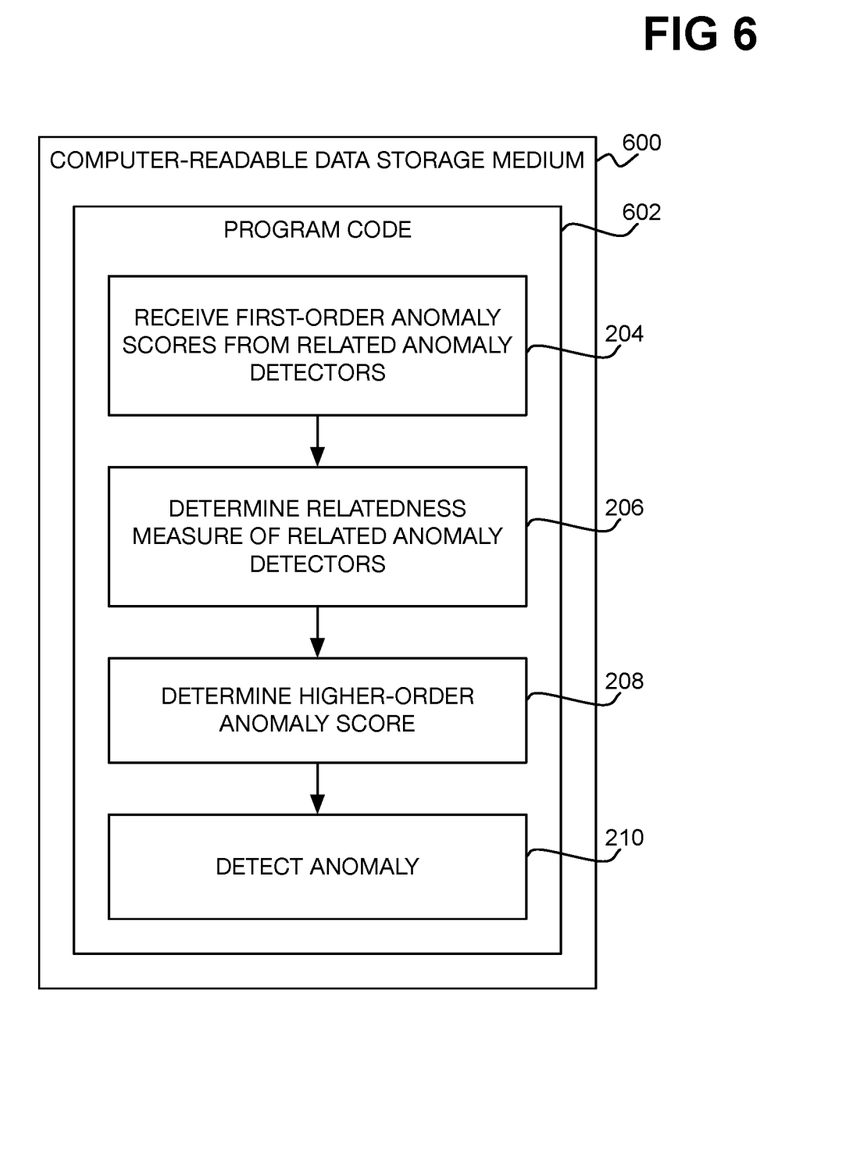
FIG. 6 is a diagram of an example computer-readable data storage medium.

FIG. 6 shows an example non-transitory computer-readable data storage medium 600. The computer-readable data storage medium 600 stores program code 602 executable by a processor to perform processing. The processing includes receiving first-order anomaly scores from related anomaly detectors (204). Each first-order anomaly score indicates a likelihood of an anomaly at a target system. The processing includes determining a relatedness measure of the related anomaly detectors (206), based on the first-order anomaly scores that have been received. The processing includes determining a higher-order anomaly score based on the relatedness measure that has been determined (208). The higher-order anomaly score also indicates a likelihood of an anomaly at the target system. The processing includes detecting an anomaly at the target system based on the higher-order anomaly score (210).

Figure 7:
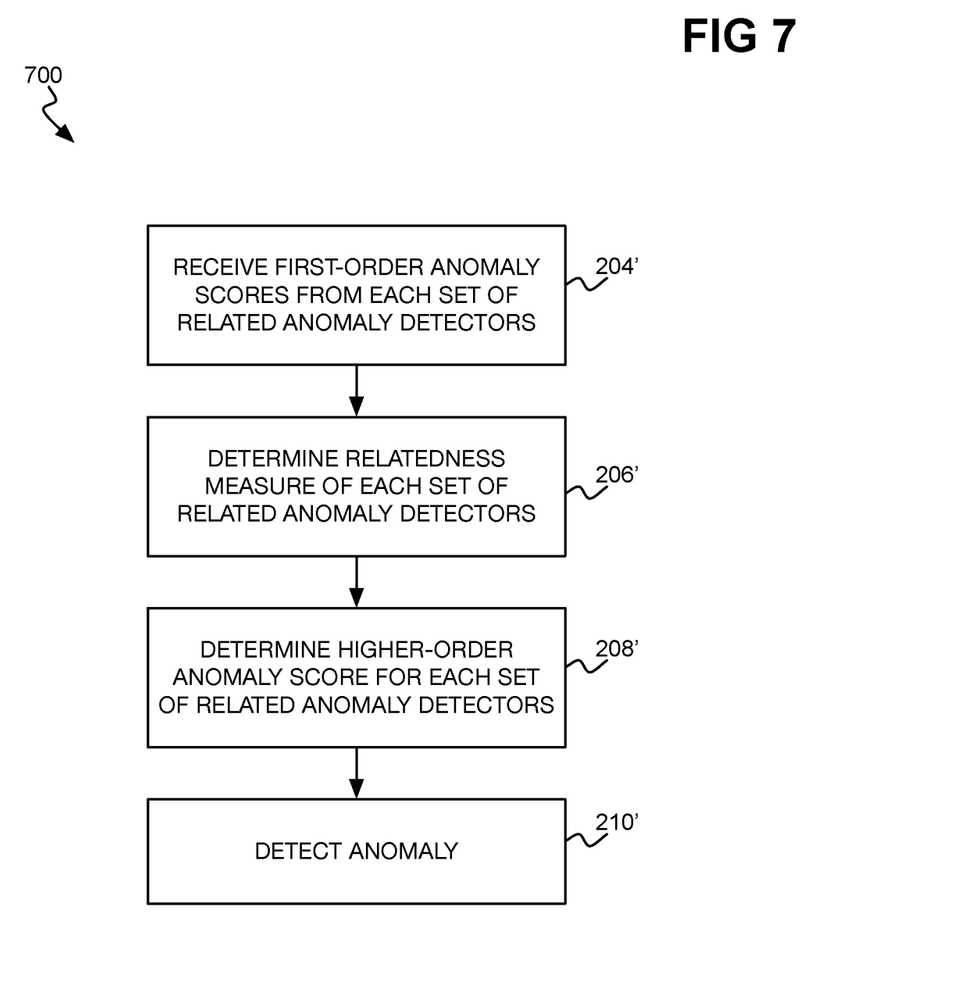
FIG. 7 is a flowchart of an example method.

FIG. 7 shows an example method 700. The method 700 can be performed by a processor. The method 700 includes receiving first-order anomaly scores from each of one or more sets of related anomaly detectors (204'). Each first-order anomaly score indicates a likelihood of an anomaly at a target system. The method 700 includes determining a relatedness measure for each set of related anomaly detectors (206'), based on the first-order anomaly scores that have been received. The method 700 includes determining a higher-order anomaly score for each set of related anomaly detectors based on the relatedness measure that has been determined (208'). The higher-order anomaly score also indicates a likelihood of an anomaly at the target system. The method 700 includes detecting an anomaly at the target system based on the higher-order anomaly score determined for each set of related anomaly detectors (210').

Figure 8:
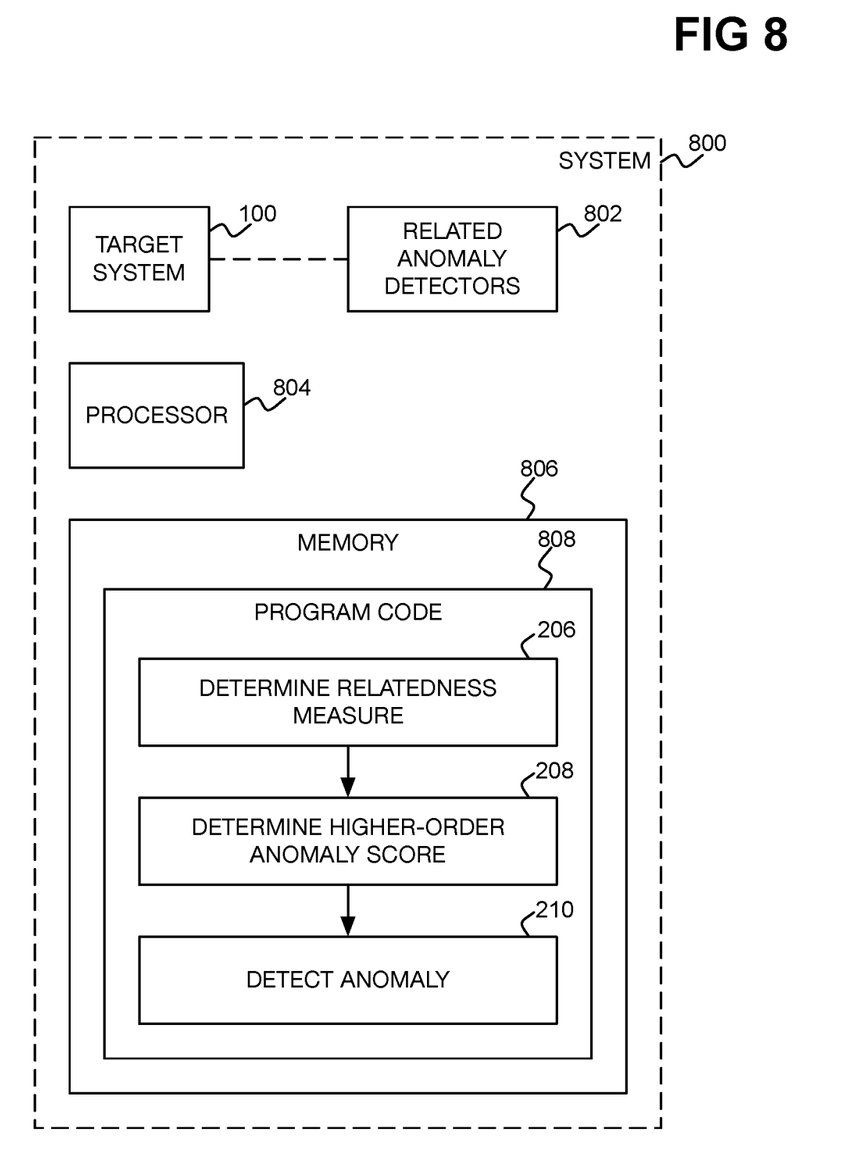
FIG. 8 is a diagram of an example system.

FIG. 8 is a diagram of an example system 800. The system 800 includes a target system 100 and related anomaly detectors 802 that each output a first-order anomaly score indicating a likelihood of an anomaly at the target system. The system 800 includes a processor 804 and memory 806 storing program code 808. The program code 800 is executable by the processor 804 to determine a relatedness measure of the related anomaly detectors, based on the first-order anomaly scores (206). The program code 800 is executable by the processor 804 to determine a higher-order anomaly score based on the relatedness measure that has been determined (208). The higher-order anomaly score also indicates a likelihood of an anomaly at the target system.

The program code 800 is executable by the processor 804 to detect an anomaly at the target system based on the higher-order anomaly score (210).

Techniques have been described herein for detecting an anomaly at a target system using a higher-order anomaly score generated based on a relatedness measure of related anomaly detectors, which is itself generated based on first-order anomaly scores output by the anomaly detectors. The higher-order anomaly score can reflect changes in the relatedness of the anomaly detectors, which may be indicative of an anomaly at the target system and which may not otherwise be detectable by using just the first-order anomaly scores.

We claim:

1. A non-transitory computer-readable data storage medium storing program code executable by a processor to perform processing comprising:

receiving a plurality of first-order anomaly scores from a plurality of related anomaly detector algorithms or techniques, each first-order anomaly score indicating a likelihood of an anomaly at a target system;

determining a relatedness measure of the related anomaly detector algorithms or techniques, based on the first-order anomaly scores that have been received;

determining a higher-order anomaly score based on the relatedness measure that has been determined, including a second-order anomaly score indicating a rate of change of the relatedness measure, the higher-order anomaly score indicating a likelihood of an anomaly at the target system;

detecting an anomaly at the target system based on the higher-order anomaly score; and in response to detecting the anomaly of the target system based on the higher-order anomaly score, reconfiguring the target system to ameliorate the anomaly.

2. The non-transitory computer-readable data storage medium of claim 1, wherein the processing further comprises:

determining, from a pool of anomaly detector algorithms or techniques, the related anomaly detector algorithms or techniques.

3. The non-transitory computer-readable data storage medium of claim 2, wherein determining, from the pool of anomaly detector algorithms or techniques, the related anomaly detector algorithms or techniques comprises:

receiving a user specification as to which of the pool of anomaly detector algorithms or techniques are the related anomaly detector algorithms or techniques.

4. The non-transitory computer-readable data storage medium of claim 2, wherein determining, from the pool of anomaly detector algorithms or techniques, the related anomaly detector algorithms or techniques comprises:

receiving a plurality of first-order anomaly scores from the pool of anomaly detector algorithms or techniques, each first-order anomaly score indicating a likelihood of an anomaly at the target system;

determining a plurality of relatedness measures of a plurality of different combinations of the anomaly detector algorithms or techniques within the pool, based on the first-order anomaly scores that have been received; and determining a selected combination of the anomaly detector algorithms or techniques as the related anomaly detector algorithms or techniques, based on the relatedness measures.

5. The non-transitory computer-readable data storage medium of claim 4, wherein determining the selected combination of the anomaly detector algorithms or techniques as the related anomaly detector algorithms or techniques comprises:

clustering the combinations of the anomaly detector algorithms or techniques into a plurality of clusters, the relatedness measures of the combinations of each cluster being invariant; and     determining a selected cluster of the combinations of the anomaly detector algorithms or techniques, as the related anomaly detector algorithms or techniques.

6. The non-transitory computer-readable data storage medium of claim 1, wherein the processing further comprises:

in response to detecting the anomaly of the target system based on the higher-order anomaly score, performing, in addition to reconfiguration of the target system, another remedial action with respect to the target system to ameliorate the anomaly.

7. The non-transitory computer-readable data storage medium of claim 1, wherein determining the relatedness measure of the related anomaly detector algorithms or techniques comprises one or more of:

determining a Jaccard similarity measure of the related anomaly detector algorithms or techniques;

determining a correlation coefficient of the related anomaly detector algorithms or techniques;

performing a principal component analysis on the related anomaly detector algorithms or techniques; and     applying an autoencoder to the related anomaly detector algorithms or techniques.

8. The non-transitory computer-readable data storage medium of claim 1, wherein determining the higher-order anomaly score based on the relatedness measure further comprises:

determining a third-order anomaly score indicating how quickly a rate of change of the relatedness measure changes over time.

9. The non-transitory computer-readable data storage medium of claim 1, wherein determining the higher-order anomaly score based on the relatedness measure further comprises:

determining an nth-order anomaly score indicating a rate of change of an (n−1)th-order anomaly score, where n is greater than or equal to three.

10. The non-transitory computer-readable data storage medium of claim 1, wherein the plurality of related anomaly detector algorithms or techniques is one of a plurality of sets of related anomaly detector algorithms or techniques,     and wherein a different higher-order anomaly score is determined for each set of related anomaly detector algorithms or techniques, and an anomaly at the target system is separately detected based on the different higher-order anomaly score for each set of related anomaly detector algorithms or techniques.

11. The non-transitory computer-readable data storage medium of claim 1, wherein the target system comprises a target computing system, and the anomaly comprises a security incident at the target computing system.

12. A method comprising:

receiving, by a processor, a plurality of first-order anomaly scores from each of one or more sets of related anomaly detector algorithms or techniques, each first-order anomaly score indicating a likelihood of an anomaly at a target system;

determining, by the processor, a relatedness measure for each set of related anomaly detector algorithms or techniques, based on the first-order anomaly scores that have been received;

determining, by the processor, a higher-order anomaly score for each set of related anomaly detector algorithms or techniques based on the relatedness measure that has been determined, including a third-order anomaly score indicating how quickly a rate of change of the relatedness measure changes over time, the higher-order anomaly score indicating a likelihood of an anomaly at the target system;

detecting, by the processor, an anomaly at the target system based on the higher-order anomaly score determined for each set of related anomaly detector algorithms or techniques; and     in response to detecting the anomaly of the target system based on the higher-order anomaly score, reconfiguring, by the processor, the target system to ameliorate the anomaly.

13. The method of claim 12, wherein the one or more sets of related anomaly detector algorithms or techniques comprises a plurality of sets of related anomaly detector algorithms or techniques.

14. The method of claim 12, further comprising:

determining, from a pool of anomaly detector algorithms or techniques, the one or more sets of related anomaly detector algorithms or techniques.

15. The method of claim 12, the higher-order anomaly score determined for each set of related anomaly detector algorithms or techniques comprising one or more of:

a second-order anomaly score indicating how quickly the relatedness measure changes over time;

a third-order anomaly score indicating how quickly a rate of change of the relatedness measure changes over time; and     an nth-order anomaly score based on the relatedness measure that has been determined over time, where n is greater than three.

16. The method of claim 12, wherein the higher-order anomaly score further includes a second-order anomaly score indicating a rate of change of the relatedness measure.

17. A system comprising:

a processor; and a memory storing program code executable by the processor to:

determine, from a pool of anomaly detector algorithms or techniques, a plurality of related anomaly detector algorithms or techniques;

determine a relatedness measure of the related anomaly detector algorithms or techniques that each output a first-order anomaly score indicating a likelihood of an anomaly at a target system, based on the first-order anomaly scores;

determine a higher-order anomaly score based on the relatedness measure that has been determined, the higher-order anomaly score indicating a likelihood of an anomaly at the target system;

detect an anomaly at the target system based on the higher-order anomaly score;

in response to detecting the anomaly of the target system based on the higher-order anomaly score, reconfigure the target system to ameliorate the anomaly,     wherein the plurality of related anomaly detector algorithms or techniques are determined from the pool of anomaly detector algorithms or techniques by:

receiving a plurality of first-order anomaly scores from the pool of anomaly detector algorithms or techniques, each first-order anomaly score indicating a likelihood of an anomaly at the target system;

determining a plurality of relatedness measures of a plurality of different combinations of the anomaly detector algorithms or techniques within the pool, based on the first-order anomaly scores that have been received; and determining a selected combination of the anomaly detector algorithms or techniques as the related anomaly detector algorithms or techniques, based on the relatedness measures, and wherein the selected combination of the anomaly detector algorithms or techniques is determined as the related anomaly detector algorithms or techniques comprises:

clustering the combinations of the anomaly detector algorithms or techniques into a plurality of clusters, the relatedness measures of the combinations of each cluster being invariant; and determining a selected cluster of the combinations of the anomaly detector algorithms or techniques, as the related anomaly detector algorithms or techniques.

18. The system of claim 17, the higher-order anomaly score determined for the related anomaly detector algorithms or techniques comprises one or more of:

a second-order anomaly score indicating how quickly the relatedness measure changes over time;

a third-order anomaly score indicating how quickly a rate of change of the relatedness measure changes over time; and an nth-order anomaly score based on the relatedness measure that has been determined over time, where n is greater than three.

19. The system of claim 17, wherein the program code is executable by the processor to further, in response to detecting the anomaly at the target system based on the higher-order anomaly score, perform, in addition to reconfiguration of the target system, another remedial action with respect to the target system to ameliorate the anomaly.

20. The system of claim 17, wherein the higher-order anomaly score further includes a second-order anomaly score indicating a rate of change of the relatedness measure.

* * * * *